United States Patent
Kalamatianos et al.

(10) Patent No.: US 12,339,783 B2
(45) Date of Patent: Jun. 24, 2025

(54) MANAGING A CACHE USING PER MEMORY REGION REUSE DISTANCE ESTIMATION

(71) Applicant: Advanced Micro Devices, Inc., Santa Clara, CA (US)

(72) Inventors: John Kalamatianos, Arlington, MA (US); Jagadish B. Kotra, Austin, TX (US); Asmita Pal, Madison, WI (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/146,883

(22) Filed: Dec. 27, 2022

(65) Prior Publication Data

US 2024/0211407 A1    Jun. 27, 2024

(51) Int. Cl.
*G06F 12/00* (2006.01)
*G06F 12/0888* (2016.01)

(52) U.S. Cl.
CPC .. *G06F 12/0888* (2013.01); *G06F 2212/1016* (2013.01)

(58) Field of Classification Search
CPC ............. G06F 12/0888; G06F 2212/1016
See application file for complete search history.

(56) References Cited

U.S. PATENT DOCUMENTS

| | | | | |
|---|---|---|---|---|
| 7,725,657 | B2 * | 5/2010 | Hasenplaugh | G06F 12/084 711/130 |
| 2015/0067262 | A1 * | 3/2015 | Uttamchandani | G06F 9/5077 711/129 |
| 2016/0147649 | A1 * | 5/2016 | Magdon-Ismail | G06F 12/0893 711/118 |
| 2016/0232093 | A1 * | 8/2016 | Kim | G06F 12/0862 |
| 2017/0083455 | A1 * | 3/2017 | Rogers | G06F 12/0891 |
| 2017/0206164 | A1 * | 7/2017 | Choi | G06F 12/0871 |

(Continued)

OTHER PUBLICATIONS

Beckmann, Nathan, et al., "Maximizing Cache Performance Under Uncertainty", IEEE International Symposium on High Performance Computer Architecture (HPCA) [retrieved Oct. 16, 2022]. Retrieved from the Internet <http://www.cs.cmu.edu/~beckmann/publications/papers/2017.hpca.eva.pdf>., Feb. 2017, 12 Pages.

(Continued)

*Primary Examiner* — Shawn X Gu
*Assistant Examiner* — Mohammad S Hasan
(74) *Attorney, Agent, or Firm* — FIG. 1 Patents

(57) ABSTRACT

A memory request issue counter (MRIC) is maintained that is incremented for every memory access a central processing unit core makes. A region reuse distance table is also maintained that includes multiple entries each of which stores the region reuse distance for a corresponding region. When a memory access request for a physical address is received, a reuse distance for the physical address is calculated. This reuse distance is the difference between the current MRIC value and a previous MRIC value for the physical address. The previous MRIC value for the physical address is the MRIC value the MRIC had when a memory access request for the physical address was last received. A region reuse distance for a region that includes the physical address is generated based on the reuse distance for the physical address and used to manage the cache.

20 Claims, 4 Drawing Sheets

(56) References Cited

U.S. PATENT DOCUMENTS

| | | | | |
|---|---|---|---|---|
| 2019/0160646 | A1* | 5/2019 | Hoossainy | H04W 64/003 |
| 2019/0163639 | A1* | 5/2019 | Wu | G06F 12/0895 |
| 2021/0011857 | A1* | 1/2021 | Zhou | G06F 12/0868 |
| 2021/0096620 | A1* | 4/2021 | Ramadoss | G06F 1/206 |
| 2021/0109861 | A1* | 4/2021 | Yin | G06F 12/0855 |

OTHER PUBLICATIONS

Das, Subhasis, et al., "Reuse Distance-Based Probabilistic Cache Replacement", ACM Transactions on Architecture and Code Optimization, vol. 12, No. 4 [retrieved Oct. 16, 2022]. Retrieved from the Internet <https://dl.acm.org/doi/pdf/10.1145/2818374>., Oct. 19, 2015, 22 Pages.

Duong, Nam, et al., "Improving Cache Management Policies Using Dynamic Reuse Distances", 2012 45th Annual IEEE/ACM International Symposium on Microarchitecture [retrieved Oct. 16, 2022]. Retrieved from the Internet <https://web.archive.org/web/20160429181105id_/http://www.ics.uci.edu:80/~nlduong/pubs/pdp.pdf>., Dec. 2012, 12 Pages.

Jiménez, Daniel, et al., "Multiperspective Reuse Prediction", 2017 50th Annual IEEE/ACM International Symposium on Microarchitecture (MICRO) [retrieved Oct. 16, 2022]. Retrieved from the Internet <https://par.nsf.gov/servlets/purl/10079351>., Oct. 2017, 13 Pages.

Keramidas, Georgios, et al., "Cache replacement based on reuse-distance prediction", 2007 25th International Conference on Computer Design [retrieved Oct. 16, 2022]. Retrieved from the Internet <https://web.archive.org/web/20170808081700id_/http://iccd.et.tudelft.nl/Proceedings/2007/Papers/5.1.5.pdf>., Oct. 2007, 6 Pages.

Sethumurugan, Subhash, et al., "Designing a Cost-Effective Cache Replacement Policy using Machine Learning", IEEE International Symposium on High-Performance Computer Architecture (HPCA) [retrieved Oct. 16, 2022]. Retrieved from the Internet <http://www.ee.umn.edu/users/jsartori/papers/hpca21.pdf>., Feb. 2021, 13 Pages.

Shi, Zhan, et al., "Applying Deep Learning to the Cache Replacement Problem", MICRO '52: Proceedings of the 52nd Annual IEEE/ACM International Symposium on Microarchitecture [retrieved Oct. 16, 2022]. Retrieved from the Internet <https://www.cs.utexas.edu/~lin/papers/micro19c.pdf>., Oct. 6, 2021, 14 Pages.

Teran, Elvira, et al., "Perceptron learning for reuse prediction", 2016 49th Annual IEEE/ACM International Symposium on Microarchitecture (MICRO) [retrieved Oct. 16, 2022]. Retrieved from the Internet <https://people.engr.tamu.edu/djimenez/pdfs/micro2016-perceptron.pdf>., Oct. 2016, 12 Pages.

Wu, Carole-Jean, et al., "Signature-based Hit Predictor for high performance caching", MICRO-44: Proceedings of the 44th Annual IEEE/ACM International Symposium on Microarchitecture [retrieved Oct. 16, 2022]. Retrieved from the Internet <https://www.inf.ufpr.br/aldri/ci212/artigos/2015-01/SHiP.pdf>., Dec. 3, 2011, 12 Pages.

* cited by examiner

MANAGING A CACHE USING PER MEMORY REGION REUSE DISTANCE ESTIMATION

GOVERNMENT LICENSE RIGHTS

This invention was made with government support under contract number H98230-21-3-0001 awarded by the Department of Defense. The government has certain rights in the invention.

BACKGROUND

Many computing devices have a memory system that includes a main memory and a cache, which is typically smaller but faster than the main memory. When a memory request is made, the device attempts to satisfy the request using the cache. If the attempt to satisfy the request using the cache fails, the device satisfies the request using the main memory. Various different techniques are used to determine what data or instructions are maintained in the cache.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
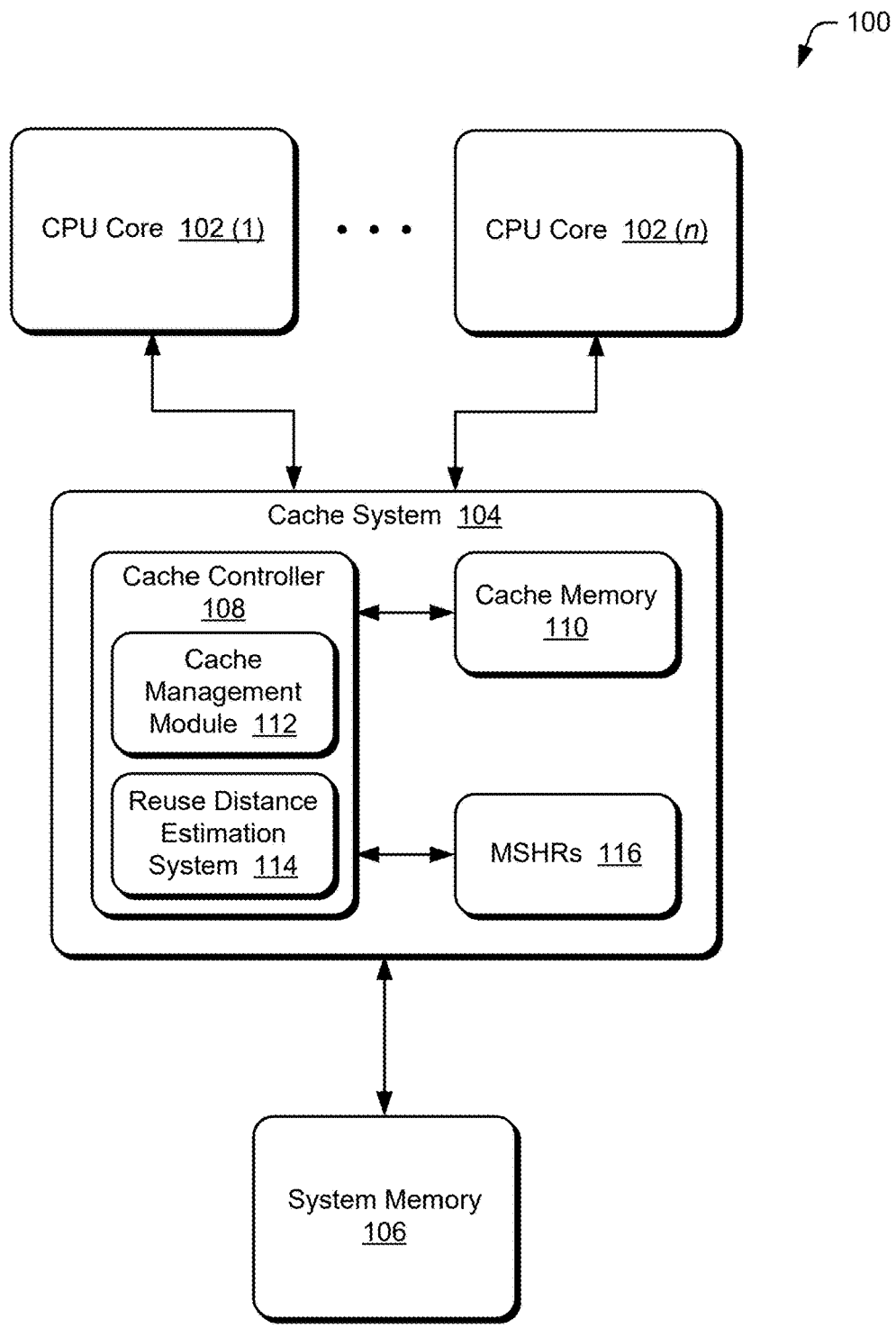
FIG. 1 is an illustration of a non-limiting example system that is operable to employ the managing a cache using per memory region reuse distance estimation described herein.

Many computer memory systems include a main memory and a cache, which is typically a smaller but faster memory than the main memory. Memory access requests (e.g., load and store memory requests) that are satisfied by the cache typically have lower latency than memory requests satisfied by the main memory. However, not all requests are satisfied by the cache because the requested data or instruction is not available in the cache, which is referred to as a cache miss. Accordingly, techniques for increasing the chances that the requested data or instruction is available in the cache are valuable for improving the performance of the cache.

The techniques discussed herein leverage a reuse distance for memory access requests. The reuse distance for a given physical address refers to how many memory access requests have been made since a memory access request for that physical address was last made. E.g., how many physical addresses (e.g., how many cache lines) have been accessed since that physical address was last accessed.

A memory request issue counter (MRIC) is maintained that is incremented for every memory access a central processing unit (CPU) core makes. A region reuse distance table (RRDT) is also maintained that includes multiple entries each of which stores the reuse distance for a corresponding region of memory. A region is associated with (or corresponds to) multiple physical addresses or cache lines. In one example, physical addresses are 64-byte aligned, a cache line is 64 bytes, and a region is 4 kilobytes.

When a memory access request for a physical address is received at a cache, a reuse distance for the physical address is calculated. This reuse distance is the difference between the current MRIC value and a previous MRIC value for the physical address. The previous MRIC value for the physical address is the MRIC value the MRIC had when a memory access request for the physical address was last received. A region reuse distance (e.g., an average region average reuse distance) is generated based on the reuse distance for the physical address. For example, the reuse distance for the physical address is averaged with a region reuse distance in an entry of the RRDT that corresponds to (e.g., includes) the physical address. The current MRIC value is also saved as being associated with (or corresponding to) the physical address. In one or more implementations, the current MRIC value is stored in a cache tag or a miss status holding register (MSHR) associated with the physical address.

The region reuse distances in the RRDT are used in any of a variety of different manners to manage the cache. For example, the region reuse distances are usable to determine whether to bypass the cache, to determine which cache lines to replace, and so forth.

The techniques discussed herein provide an intelligent solution for cache management that is based on an estimate of when a memory access request for a physical address will be received again. In contrast to conventional cache replacement techniques such as least recently used (LRU), where the least recently used cache line is replaced, the techniques discussed herein are more intelligent and are based on an estimated time of when a cache line will be used again, making it more likely that data or instructions will be available in the cache when requested. Furthermore, the techniques discussed herein are able to avoid storing data or instructions in the cache that are estimated to not be accessed for a long period of time, thereby avoiding evicting data or instructions from the cache to store other data or instructions that are estimated to not be accessed for a long period of time.

In some aspects, the techniques described herein relate to a method including: receiving, at a cache system, a memory access request for a physical address, calculating a reuse distance for the physical address, updating, based at least in part on the reuse distance, a region reuse distance that corresponds to a memory region that includes the physical address, and managing, based at least in part on the region reuse distance, the cache system.

In some aspects, the techniques described herein relate to a method, further including: maintaining a memory request issue counter that is incremented in response to each memory access request issued by a central processing unit core, and wherein calculating the reuse distance for the physical address includes: receiving a current memory request issue counter value, receiving a previous memory request issue counter value associated with the physical address, and calculating, as the reuse distance for the physical address, a difference between the current memory request issue counter value and the previous memory request issue counter value.

In some aspects, the techniques described herein relate to a method, wherein the previous memory request issue counter value is stored in a cache tag or a miss status handling register, and the method further includes replacing the previous memory request issue counter value in the cache tag or the miss status handling register with the current memory request issue counter value.

In some aspects, the techniques described herein relate to a method, wherein the updating includes updating the region reuse distance stored in an entry of a region reuse distance table, wherein the entry corresponds to the memory region that includes the physical address.

In some aspects, the techniques described herein relate to a method, further including: calculating an updated region reuse distance based on the reuse distance for the physical address and a region reuse distance stored in the entry of the region reuse distance table, and wherein the updating the region reuse distance includes replacing the region reuse distance stored in the entry with the updated region reuse distance.

In some aspects, the techniques described herein relate to a method, wherein calculating the updated region reuse distance includes calculating a region average reuse distance by averaging the reuse distance for the physical address and the region reuse distance stored in the entry of the region reuse distance table.

In some aspects, the techniques described herein relate to a method, wherein the managing the cache system includes selecting, based on the region reuse distance, one of multiple cache lines stored in the cache system to evict from the cache system.

In some aspects, the techniques described herein relate to a method, wherein the managing the cache system includes conditionally allocating, based on the region reuse distance, a cache line for the physical address in the cache system.

In some aspects, the techniques described herein relate to a method, further including aging the region reuse distance over time.

In some aspects, the techniques described herein relate to a cache system including: a reuse distance determination module to calculate a reuse distance for a physical address associated with a memory access request, a region reuse distance determination module to update, based at least in part on the reuse distance, a region reuse distance that corresponds to a memory region that includes the physical address, and a cache management module to manage, based at least in part on the region reuse distance, the cache system.

In some aspects, the techniques described herein relate to a cache system, further including: a memory request issue counter that is incremented in response to each memory access request issued by a central processing unit core, and wherein the reuse distance determination module is to calculate the reuse distance for the physical address by: receiving a current memory request issue counter value, receiving a previous memory request issue counter value associated with the physical address, and calculating, as the reuse distance for the physical address, a difference between the current memory request issue counter value and the previous memory request issue counter value.

In some aspects, the techniques described herein relate to a cache system, wherein the previous memory request issue counter value is stored in a cache tag or a miss status handling register, and wherein the reuse distance determination module is further to replace the previous memory request issue counter value in the cache tag or the miss status handling register with the current memory request issue counter value.

In some aspects, the techniques described herein relate to a cache system, wherein the region reuse distance determination module is to update the region reuse distance by updating the region reuse distance stored in an entry of a region reuse distance table, wherein the entry corresponds to the memory region that includes the physical address.

In some aspects, the techniques described herein relate to a cache system, wherein the region reuse distance determination module is to calculate an updated region reuse distance based on the reuse distance for the physical address and a region reuse distance stored in the entry of the region reuse distance table, and wherein to update the region reuse distance is to replace the region reuse distance stored in the entry with the updated region reuse distance.

In some aspects, the techniques described herein relate to a cache system, wherein the cache management module is to manage the cache system by selecting, based on the region reuse distance, one of multiple cache lines stored in the cache system to evict from the cache system.

In some aspects, the techniques described herein relate to a cache system, wherein the cache management module is to manage the cache system by conditionally allocating, based on the region reuse distance, a cache line for the physical address in the cache system.

In some aspects, the techniques described herein relate to a cache system, wherein the region reuse distance determination module is further to age the region reuse distance over time.

In some aspects, the techniques described herein relate to a computing device including: a cache memory, and a cache controller to receive a memory access request for a physical address, calculate a reuse distance for the physical address, update, based at least in part on the reuse distance, a region reuse distance that corresponds to a memory region that includes the physical address, and manage, based at least in part on the region reuse distance, the cache memory.

In some aspects, the techniques described herein relate to a computing device, wherein the cache controller is further configured to: maintain a memory request issue counter that is incremented in response to each memory access request issued by a central processing unit core, and wherein to calculate the reuse distance for the physical address includes: receiving a current memory request issue counter value, receiving a previous memory request issue counter value associated with the physical address, and calculating, as the reuse distance for the physical address, a difference between the current memory request issue counter value and the previous memory request issue counter value.

In some aspects, the techniques described herein relate to a computing device, wherein to update the region reuse distance is to update the region reuse distance stored in an entry of a region reuse distance table, wherein the entry corresponds to the memory region that includes the physical address.

FIG. 1 is an illustration of a non-limiting example system 100 that is operable to employ the managing a cache using per memory region reuse distance estimation described herein. The system 100 includes various components including multiple (n) central processing unit (CPU) cores 102 (1), . . . , 102 (n), a cache system 104, and a system memory 106. Although a system with multiple CPU cores 102 are illustrated, it is to be appreciated that the system 100 optionally includes a single CPU core 102 that accesses the cache system 104. The system 100 supports virtual memory, which refers to programs running in the system 100 being allocated a range of virtual memory in a virtual memory space. The system 100 maps virtual addresses that are in the virtual memory space to physical addresses in the physical memory (e.g., system memory 106). The system 100 also transfers data stored in portions (e.g., pages) of physical memory to and from a storage device (not shown), such as a hard drive or solid-state drive, as needed, a process oftentimes referred to as paging.

The cache system 104 includes a cache controller 108 and a cache memory 110. The cache memory 110 is memory that is typically faster than the system memory 106. A cache memory 110 is, for example, an instruction cache, a data cache, an instruction or data translation lookaside buffer (TLB), or a combination thereof (e.g., a unified cache). In one or more implementations, the system memory 106 is any of a variety of volatile memory, such as dynamic random access memory (DRAM). Additionally or alternatively, the system memory 106 is any of a variety of nonvolatile memory, such as resistive random access memory (e.g., memristors).

The system 100 is implementable in any of a variety of different types of computing devices that include or use cache memory. For example, the system 100 is implementable in a smartphone or other wireless phone, a tablet or phablet computer, a notebook computer (e.g., netbook or ultrabook), a laptop computer, a server computer, a supercomputer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television), an Internet of Things (IOT) device, an automotive computer, and so forth.

The cache controller 108 includes a cache management module 112 and a reuse distance estimation system 114. The cache management module 112 manages or controls the cache memory 110 (also referred to as managing or controlling the cache system 104), determining whether requested data or instructions are stored in the cache memory 110, retrieving data or instructions that are not stored in the cache memory 110 from the system memory 106, determining which cache lines are to be evicted from the cache memory 110 to make room for new cache lines, and so forth. The cache management module 112 is implemented in any of hardware, software, firmware, or a combination thereof. In one example, the cache management module 112 is configured as a microcontroller to perform a variety of the operations for managing or controlling the cache memory 110 as discussed above and below. In another example, the cache management module 112 is implemented using hardware, such as an Application Specific Integrated Circuit (ASIC) or other integrated circuit (IC) to perform a variety of the operations for managing or controlling the cache memory 110 as discussed above and below.

One example of operations for managing or controlling the cache memory is the cache management module 112 checks whether a memory access request to a physical address corresponds to a region with a region reuse distance larger than the region reuse distance of all other cache lines in the cache memory 110. If the region reuse distance is larger than the region reuse distance of all other cache lines in the cache memory 110, then the cache management module 112 does not store data for the memory access request in the cache memory 110. However, if the region reuse distance is not larger than the region reuse distance of all other cache lines in the cache memory 110, then the cache management module 112 replaces a cache line in the cache memory 110 (e.g., a least recently used cache line) with the data for the memory access request in the cache memory 110.

The reuse distance estimation system 114 calculates and tracks region reuse distances for regions of physical memory (e.g., the system memory 106), which is optionally used by the cache management module 112 in managing the cache memory 110.

The cache system 104 also includes a set of miss status holding registers (MSHRs) 116. The cache management module 112 allocates an MSHR to track the status of outstanding cache misses. In the event of a cache miss for a physical address, an MSHR is allocated corresponding to the physical address, anticipating that the data coming with the response will be stored in the cache. The MSHRs 116 allow the cache management module 112 to coalesce same cache line data accesses from threads of different core or threads in the same core to avoid sending redundant requests to the system memory 106.

Although the cache system 104 is illustrated with a cache controller 108 and a cache memory 110, the cache system 104 optionally includes any number of cache levels. In one or more implementations, the cache system 104 includes multiple level 2 (L2) caches (each including a cache controller and cache memory), one L2 cache corresponding to each of the CPU cores 102 (1), ... 102 (n). The cache system 104 also includes a level 3 (L3) cache (including a cache controller and cache memory) that is shared by the CPU cores 102 (1), ... 102 (n). Each CPU core 102 (1), ... 102 (n) also includes an internal level 1 (L1) cache (not shown), each including a cache controller and cache memory. Although examples of the system 100 are discussed herein as including three cache levels (L1, L2, and L3), it is to be appreciated that the system 100 optionally includes any number of cache levels.

The cache level in the cache system 104 immediately preceding the system memory 106 is also referred to as the last-level cache (LLC). In one or more implementations, the LLC is an exclusive cache, which refers to a cache that stores data that is not also stored in the immediately preceding level cache. Additionally, or alternatively, the LLC is another type of cache, such as a semi-exclusive cache. A semi-exclusive cache is an exclusive cache for some data and an inclusive cache for other data (e.g., is able to store some data that is not also stored in the immediately preceding level cache, and some data that is also stored in the immediately preceding level cache).

Although the discussions herein include reference to various cache levels (e.g., L1, L2, and L3 caches), it is to be appreciated that the techniques discussed herein are also applicable to address translations stored in TLBs.

Figure 2:
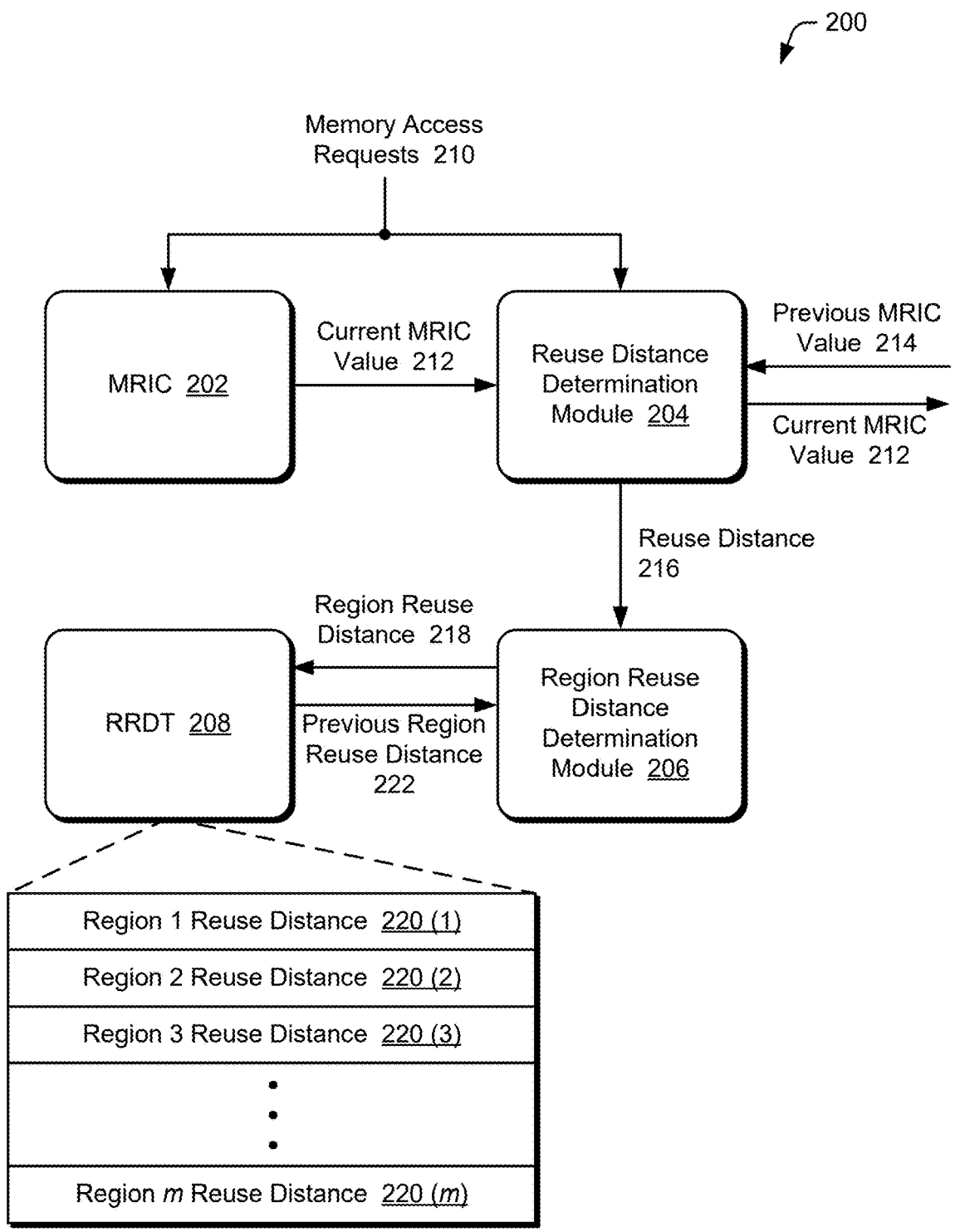
FIG. 2 is an illustration of operation of an example reuse distance estimation system supporting the techniques discussed herein.

FIG. 2 is an illustration of operation of an example reuse distance estimation system 200 supporting the techniques discussed herein. The reuse distance estimation system 200 is, for example, a reuse distance estimation system 114 of FIG. 1. The reuse distance estimation system 200 includes an MRIC 202, a reuse distance determination module 204, a region reuse distance determination module 206, and a region reuse distance table (RRDT) 208.

The MRIC 202 receives an indication of memory access requests 210, such as read and write requests. The MRIC 202 is incremented for every memory access a CPU core 102 makes. In one or more implementations the MRIC 202 is a per-thread counter. For each memory access request 210, the MRIC 202 provides a current MRIC value 212 to the reuse distance determination module 204.

In one or more implementations, the MRIC 202 is not incremented for certain memory access requests. For example, the MRIC 202 is not incremented for replayed memory access requests (e.g., loads and stores) due to data mis-speculation (e.g., memory dependence mispredictions) and memory ordering violations. This is to prevent a replayed memory access request with the same physical address from skewing reuse distance estimates. However, the MRIC 202 is incremented for memory access requests (e.g., loads and stores) issued on a mis-speculated control flow path (due to a branch misprediction) because data or instructions from that path still update the cache memory 110 even if their corresponding loads and stores are flushed from the CPU core 102 pipeline. During the CPU core 102 pipeline flush no updates or adjustments are made to the MRIC 202.

In response to a memory access request 210, the reuse distance determination module 204 calculates a reuse distance for the physical address in the memory access request 210. The reuse distance determination module 204 receives the current MRIC value 212 and also a previous MRIC value 214 associated with the physical address in the memory access request 210. The reuse distance determination module 204 calculates the reuse distance as the difference between the current MRIC value 212 and the previous MRIC value 214 (e.g., the previous MRIC value 214 subtracted from the current MRIC value 212) for the physical address.

The previous MRIC value 214 for the physical address is the MRIC value the MRIC 202 had when a memory access request for the physical address was last received. The previous MRIC value 214 for a physical address is stored, for example, in the cache memory 110 (e.g., as a tag in the cache line that stores the data or instruction at the physical address) or in one of the MSHRs 116 corresponding to the physical address or in a separate memory array.

The reuse distance determination module 204 also stores the current MRIC value 212, replacing the previous MRIC value 214. For example, if the previous MRIC value 214 is stored in a tag in the cache line that stores the data or instruction at the physical address, then the reuse distance determination module 204 overwrites the value in that tag with the current MRIC value 212.

The reuse distance determination module 204 is implemented in any of hardware, software, firmware, or a combination thereof. In one example, the reuse distance determination module 204 is implemented as a circuit that subtracts the previous MRIC value 214 from the current MRIC value 212. In another example, the reuse distance determination module 204 is implemented as a microcontroller running firmware to receive the current MRIC value 212, retrieve the previous MRIC value 214, determine the difference between the current MRIC value 212 and the previous MRIC value 214 (e.g., subtract the previous MRIC value 214 from the current MRIC value 212), store the current MRIC value 212, and output as the reuse distance 216 the difference between the current MRIC value 212 and the previous MRIC value 214.

The reuse distance determination module 204 provides the calculated reuse distance to the region reuse distance determination module 206 as reuse distance 216. The region reuse distance determination module 206 generates a region reuse distance (e.g., a region reuse distance 218) based on the reuse distance 216 for the physical address. The RRDT 208 includes multiple (m) region reuse distances 220 (1), . . . , 220 (m), each being a separate entry in the RRDT 208. A region includes (also referred to as being associated with or corresponding to) one or multiple physical addresses or cache lines. In one example, physical addresses are 64-byte aligned, a cache line is 64 bytes, and a region is 4 kilobytes. Additionally or alternatively, regions are optionally of other sizes that are larger or smaller than an operating system defined physical page. Example regions include 64 bytes, 2 kilobytes, 1 megabyte, and so forth. In one or more implementations, the RRDT 208 is indexed by the physical page number (PPN). The PPN is extracted from the upper bits of the physical address of the memory access request.

The region reuse distance determination module 206 retrieves the region reuse distance 220 corresponding to the physical address (e.g., the region reuse distance 220 for the region that includes the physical address) from the RRDT 208, illustrated as previous region reuse distance 222. The region reuse distance determination module 206 combines the reuse distance 216 for the physical address with the previous region reuse distance 222, and replaces, in the RRDT 208, the previous region reuse distance 222 with the region reuse distance 218.

The region reuse distance determination module 206 combines the reuse distance 216 and the region reuse distance 220 in any of a variety of different manners. In one or more implementations, the reuse distance 216 for the physical address is averaged with the region reuse distance value (in which case the region reuse distances are also referred to as region average reuse distances). For example, if there are x−1 physical addresses corresponding to a region that have been sent to the RRDT 208 and one instance of the reuse distance 216, the RRDT 208 stores the sum of the x−1 values and the value x. The region reuse distance determination module 206 adds the sum of the x−1 values together with the reuse distance 216 and divides the new sum by x to generate the new region reuse distance 218.

The region reuse distance determination module 206 is implemented in any of hardware, software, firmware, or a combination thereof. In one example, the region reuse distance determination module 206 is implemented as a circuit that combines (e.g., averages) the reuse distance 216 and the previous region reuse distance 222. In another example, the region reuse distance determination module 206 is implemented as a microcontroller running firmware to receive the reuse distance 216, retrieve the previous region reuse distance 222 from the RRDT 208, combine (e.g., average) the reuse distance 216 to generate the region reuse distance 218, and store the region reuse distance 218 in the RRDT 208.

The cache management module 112 uses the region reuse distances 220 in the RRDT 208 in any of a variety of different manners to manage the cache system 104 (e.g., to manage the cache memory 110), such as to determine whether to bypass the cache, to determine which cache lines to replace, and so forth. In one or more implementations, the cache management module 112 allows memory access requests to a physical address corresponding to a region with a region reuse distance larger than the region reuse distance of all other cache lines in the cache set to bypass the cache memory 110 (e.g., to not be stored in the cache memory 110) to avoid polluting the cache by evicting other lines with a shorter region reuse distance. Cache pollution refers to, for example, a situation where a first cache line is evicted from the cache memory 110 to make room for a second cache line when the second cache line itself is more likely to be evicted from the cache memory 110 before being accessed again. Additionally or alternatively, the cache management module 112 allows a cache line for memory access requests to a physical address corresponding to a region with a region reuse distance shorter than at least one of the cache lines in the cache set to be allocated in the cache memory 110, increasing utilization of the cache memory 110. Additionally or alternatively, the cache management module allows a cache line for memory access requests to a physical address corresponding to a region with longer reuse distance than the cache line of the memory request with reuse distance 216 to be replaced with the cache line of the memory request with reuse distance 216, improving cache memory miss rate.

Although the discussion herein includes the region reuse distance determination module 206 calculating a region reuse distance 218 as an average value, it should be noted that the region reuse distance determination module 206 optionally generates values for the RRDT 208 in manners other than averaging. Examples of such other manners include a weighted averaging or other statistical methods. The values in the RRDT 208 are also optionally aged, as discussed in more detail below.

In one or more implementations, a computing device includes an L1 cache, an L2 cache, and an L3 cache. The reuse distance estimation system 200 is optionally used with multiple ones of the L1, L2, and L3 cache. Additionally or alternatively, a separate reuse distance estimation system 200 is used for each of the L1, L2, and L3 caches.

In one or more implementations, the reuse distance determination module 204 records the MRIC value for each non-replayed memory access request issued to the L1 cache. The MRIC value is used in the cache hierarchy to compute the region reuse distance as follows. If the memory request generated from the memory access request goes to system memory 106 to fetch the data, the MRIC value gets installed in the L1 cache memory (and the L2 cache memory if the L2 is inclusive). In order to avoid sending the MRIC value to the system memory 106 and back, the MRIC value is kept in the MSHR of the caches where the data will be installed (e.g., L1 and L2 cache memories) and gets written to the cache tags at fill time. If the memory access request hits in the L1, L2 or L3 (if L3 is inclusive) cache memory, then the MRIC value is compared against the MRIC value recorded in the cache tags and the region reuse distance determination module 206 uses the difference to update the region reuse distance in the RRDT 208 as discussed above. In one or more implementations, there is an RRDT 208 for each level of the cache hierarchy. In one or more implementations, only the RRDT of the cache where the data is found is updated. In another implementation, the RRDT of the cache where data is installed and all inclusive caches is updated (e.g., RRDT of L2 and L3 if both are inclusive or RRDT of L2 only if L3 is exclusive and L2 is inclusive). The new MRIC value also replaces the previous MRIC value in the cache tags where the data was found.

If the L3 is exclusive and the request hits on the L3 cache memory, the flow is different because data is evicted from the L3 cache memory and installed in the L1 and L2 cache memories (while also returned to the CPU core 102). In this case, the L3 RRDT table is updated with the combined (e.g., averaged) reuse distance as is the default policy, but the latest MRIC value replaces the old ones in both MRIC L1 and L2 cache memories (where the requested data is now placed). Since this flow sometimes generates an L2 victim (to make space for the L3 data or instructions) that gets installed in the L3 cache, the MRIC value of the L2 victim is also sent along with the victim data to update the L3 tags. No update to the L3 RRDT need be made for the L2 victim.

For an L2 inclusive cache, it is possible that data resides in both the L1 and the L2 cache memories. In this case the MRIC value and the RRDT for only the L1 cache memory copies are updated. The L2 copies will have stale MRIC values and stale reuse distance metadata in the L2 RRDT. This sometimes leads to wrong decisions by the L2 replacement policy due to capacity or conflict miss. An L2 line eviction will force an invalidation of the L1 cache memory copy to enforce inclusion. In order to reduce the frequency of forced L1 cache memory invalidations due to stale MRIC and reuse distance information, the L2 RRDT and L2 MRIC values are updated for every L1 cache memory hit. The update optionally occurs lazily and does not have to be coupled with the L1 RRDT and MRIC update.

In one or more implementations, the same RRDT 208 is used to track region reuse distance for code regions as well as data regions.

In one or more implementations, whenever a trap or interrupt occurs the CPU core 102 pipeline is flushed and the thread restarts after the trap or interrupt is serviced from the same point. During that time, any memory access requests issued to the cache system 104 after the instruction taking the trap or interrupt complete their pending memory accesses (but do not commit to machine state) as the trap or interrupt handler is running. The MRIC is incremented, and reuse distance is computed as discussed above for those memory access requests. After the trap or interrupt handler completes, the same memory access requests will be re-issued to memory and at this point possibly hit in the cache memory 110. Although this somewhat skews the MRIC values and the region reuse distances in some situations, given that traps and interrupts are infrequent, and the number of memory access requests issued twice is very small, no special action is taken to filter those updates. However, the MRIC values and the RRDT need not be updated for memory accesses issued by the trap or interrupt handler.

Additionally or alternatively (e.g., if the skew is considered significant enough), the MRIC value of every issued memory access request is recorded in the load queue (LDQ) and store queue (STQ) or in the instruction window (IW). Whenever a trap or interrupt occurs, the MRIC is decremented by the number of loads or stores flushed from the CPU core 102 pipeline. This number is determined by subtracting, from the current MRIC value, the MRIC value recorded in the oldest LDQ or STQ entry or in the oldest load or store entry of the IW.

In one or more implementations, the CPU cores 102 and the cache system 104 are implemented in a core complex. The core complex is typically included on a physical die referred to as a core complex die (CCD). A single device (e.g., a computer or any other computing device as discussed above) includes one or more CCDs. Probe traffic checking whether particular cache lines are stored in the cache system 104 is received from one or more other CCDs or from within the CCD (e.g., from an L1 cache in a CPU core 102). When probes arrive at a given cache level the MRIC value stored in the tags does not change (assuming the probe does not invalidate the line). This is true independent of whether the probe is internal to the CCD (e.g., L1 invalidating probe due to a L2 eviction) or external to the CCD (probe from another CCD).

In one or more implementations, a context switch is performed in the computing device where the current machine state of a currently executing process or thread is stored so that a different process or thread is executed. Upon a context switch, the RRDT 208 is optionally saved and restored along with the machine state of the thread in order to save training time (e.g., generating values for the RRDT 208). The RRDT 208 need not be reset because it still serves replacement or allocation decisions in the cache hierarchy along with the data of the new thread scheduled on the CPU core. There is no need to clear the MRIC values from the cache tags. It should be noted that in some situations if the new thread scheduled in the CPU core 102 accesses the same code as the prior one (e.g., different threads of the same process or different processes accessing the same libraries), preserving the RRDT 208 and MRIC values helps performance because the pre-existing reuse distance information helps make better cache management for code requests.

Using virtual memory, situations arise in which a TLB shootdown occurs, where the operating system migrates a memory page. As a result, the virtual address to physical address mappings are possibly going to change. In one or more implementations, on any TLB shootdown, the RRDT entries are reset since the virtual address to physical address mappings for the pages being tracked in the RRDT are possibly going to change.

Using the techniques discussed herein, cache allocation (e.g., as managed by the cache management module 112) is conditional and depends on the replacement policy. This is in contrast to conventional caching policies where a new cache line is always installed and the only question is which existing cache line is to be evicted. In one or more implementations, whenever a new line is fetched from the system memory 106 and is considered for allocation to the L1 cache and L2 (assuming L2 is inclusive), then the RRDT 208 of each target cache is probed for a maximum of Z+1 regions, where Z is the target cache associativity. The extra region is for the physical address of the incoming data. Note that this is the maximum because it is possible that a physical page has multiple lines in the same cache set. The cache line selected to be evicted is the cache line included in the region that has the maximum region reuse distance among all Z+1 regions. If there are multiple cache lines from the region having the maximum region reuse distance, then a line among those multiple cache lines is selected (e.g., randomly or using a conventional replacement policy by selecting the LRU line). If there are regions with no recorded region reuse distance in the RRDT then, for example, a cache line is selected as discussed above using the remaining regions, or a conventional replacement policy is used to select a victim (e.g., LRU).

Additionally or alternatively, a minimum, programmable limit is enforced on the number of updates to each RRDT entry before considering the region reuse distance for that region during replacement or allocation. If the incoming data has a physical address within the selected region (e.g., maximum region reuse distance) then the data is not allocated in the cache (but rather bypassed to the system memory 106). Accordingly, the techniques discussed herein do not require dedicated predictors for enabling cache bypassing. It should be noted that after a replacement or allocation decision, no other update is needed in the RRDT or MRIC values of the cache lines in a set.

The same process occurs when new data is allocated in an exclusive L3 by an L2 victim. The L3 RRDT is probed by the Z regions of the Z cache lines in the L3 cache set and by the region of the L2 victim which is considered for L3 allocation.

In the case of a physically distributed LLC, in one or more implementations the computing device includes a physically distributed RRDT with one instance per LLC slice, where the region reuse distance per page in each RRDT instance is calculated using the memory access requests to that LLC slice only. Additionally or alternatively, each RRDT instance tracks the region reuse distance per page for all traffic accessing the LLC (not just the traffic mapped to a specific LLC slice). This includes broadcasting the region reuse distance per line across a dedicated interconnect to all LLC slices so the individual RRDT instances are kept in synchronization.

In one or more implementations, every time the RRDT entry for a region is updated (e.g., based on a hit or a miss to a given cache set), the RRDT entries corresponding to the regions having at least one line in the same cache set are also updated. For those pages, the region reuse distance estimates increase by the standard deviation of the region reuse distance. Accordingly, in such implementations, the region reuse distance determination module 206 determines, when determining the region reuse distance for a region, the standard deviation of the region reuse distance for that region. The standard deviation for the region is also stored in the entry in the RRDT 208 corresponding to that region. Since those pages did not experience an actual access, their reuse is downgraded (e.g., the region reuse distance grows larger) by the amount of fluctuation in reuse distance observed in the past (the standard deviation). This ages the region reuse distance for certain regions over time based on certain criteria, helping prevent cache lines of a region that recorded a very short region reuse distance but have not been accessed for a while from being kept in the cache memory 110 even though they have not been accessed for a long time.

Additionally or alternatively, region reuse distance determination module 206 ages the region reuse distance per region over time (e.g., in fixed periods of cycles), such as over a preprogrammed number of requests or based on recency of access in the RRDT 208. For example, the RRDT 208 is organized as a set associative table and a form of LRU used to track recency and manage its entries.

In one or more implementations, aging of the region reuse distance estimates recorded in the RRDT 208 is triggered by evictions in the TLB hierarchy (e.g., L1 TLB, L2 TLB, and so forth). Evictions in the TLB hierarchy indicate changes in the temporal data reuse for the pages whose translation is being evicted, thus proactively aging the region reuse distance for those pages in the RRDT 208 helps improve the accuracy of the cache management decisions.

In one or more implementations, MRIC values are tracked at all cache levels and the MRIC value is sent along with every request from the CPU core 102 to all cache levels. Additionally or alternatively, an MRIC 202 is added to every cache level, which allows a request that is installed to a cache level to store the MRIC value associated with miss or fill time in the cache tags. The rest of the procedures discussed above remain the same. In such implementations, the region reuse distance values measured at cache level Y correspond to those seen only by the miss traffic of cache level Y−1 and not to those of the entire application. For a cache such as the LLC that is optionally physically distributed (e.g., in address-interleaved slices), one MRIC 202 is implemented per slice. By adding an MRIC 202 to every cache level, the amount of hardware (e.g., wires) used to implement the techniques discussed herein relative to sending MRIC values along with every request from the CPU core 102 to all cache levels is reduced.

In one or more implementations, the region reuse distance based cache management techniques discussed herein are used in conjunction with one or more other conventional replacement policies (e.g., LRU, pseudo LRU, random, etc.) using a set dueling method. Using set dueling, a number of pre-selected LLC sets use one method (e.g., a conventional replacement policy) and another pre-selected group of LLC sets use the other method (reuse distance based cache management technique). Based on the LLC misses over time counted on each of those pre-selected sets, set-dueling logic uses one of the two methods for all other LLC sets.

Figure 3:
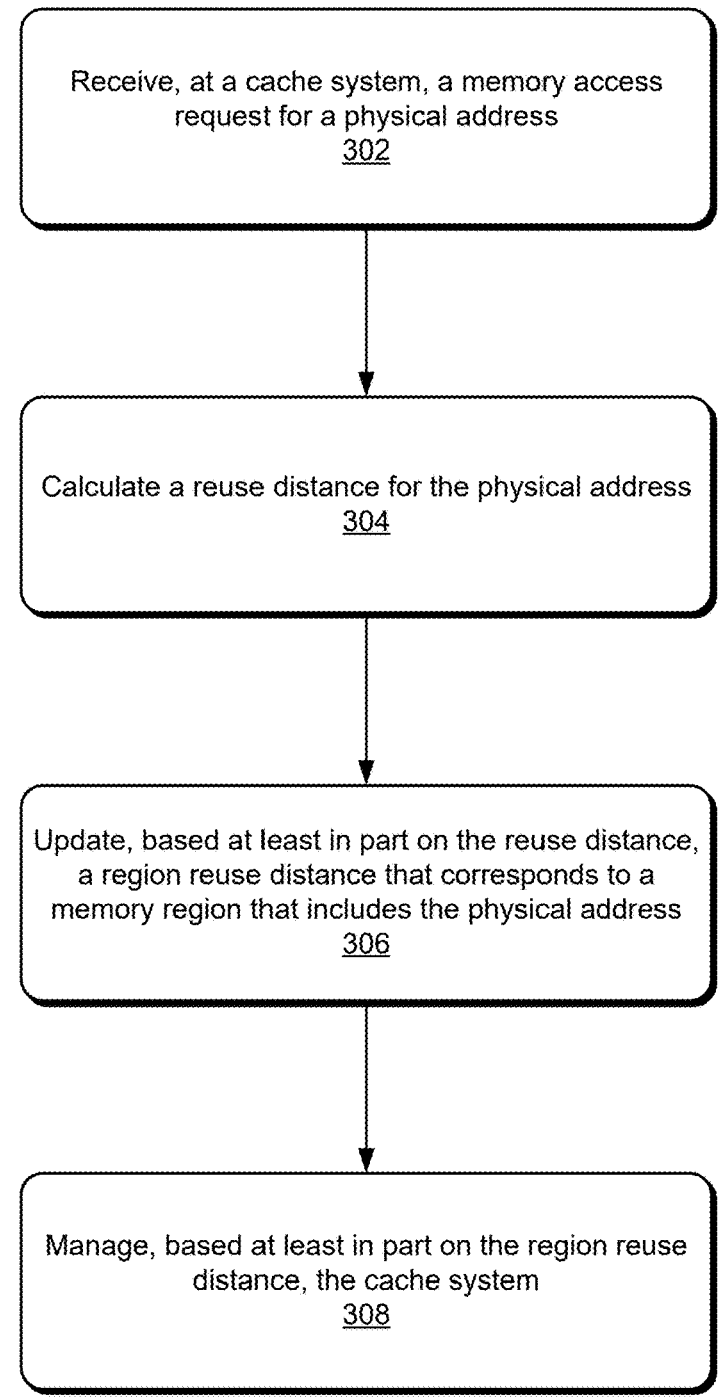
FIG. 3 is a flow diagram depicting a procedure in an example implementation of managing a cache using per memory region reuse distance estimation.

FIG. 3 is a flow diagram 300 depicting a procedure in an example implementation of managing a cache using per memory region reuse distance estimation. The flow diagram 300 is performed by a reuse distance estimation system, such as reuse distance estimation system 114 of FIG. 1 or reuse distance estimation system 200 of FIG. 2.

In this example, a memory access request for a physical address is received at a cache system (block 302). The cache system includes a cache memory and a cache controller.

A reuse distance for the physical address is calculated (block 304). The reuse distance is calculated as, for example, the difference between a current MRIC value and an MRIC value the last time the physical address was accessed.

A region reuse distance that corresponds to a memory region that includes the physical address is updated based at least in part on the reuse distance (block 306).

The cache system is managed based at least in part on the region reuse distance (block 308). This management includes, for example, determining whether to bypass the cache, determining which cache lines to replace, and so forth.

Figure 4:
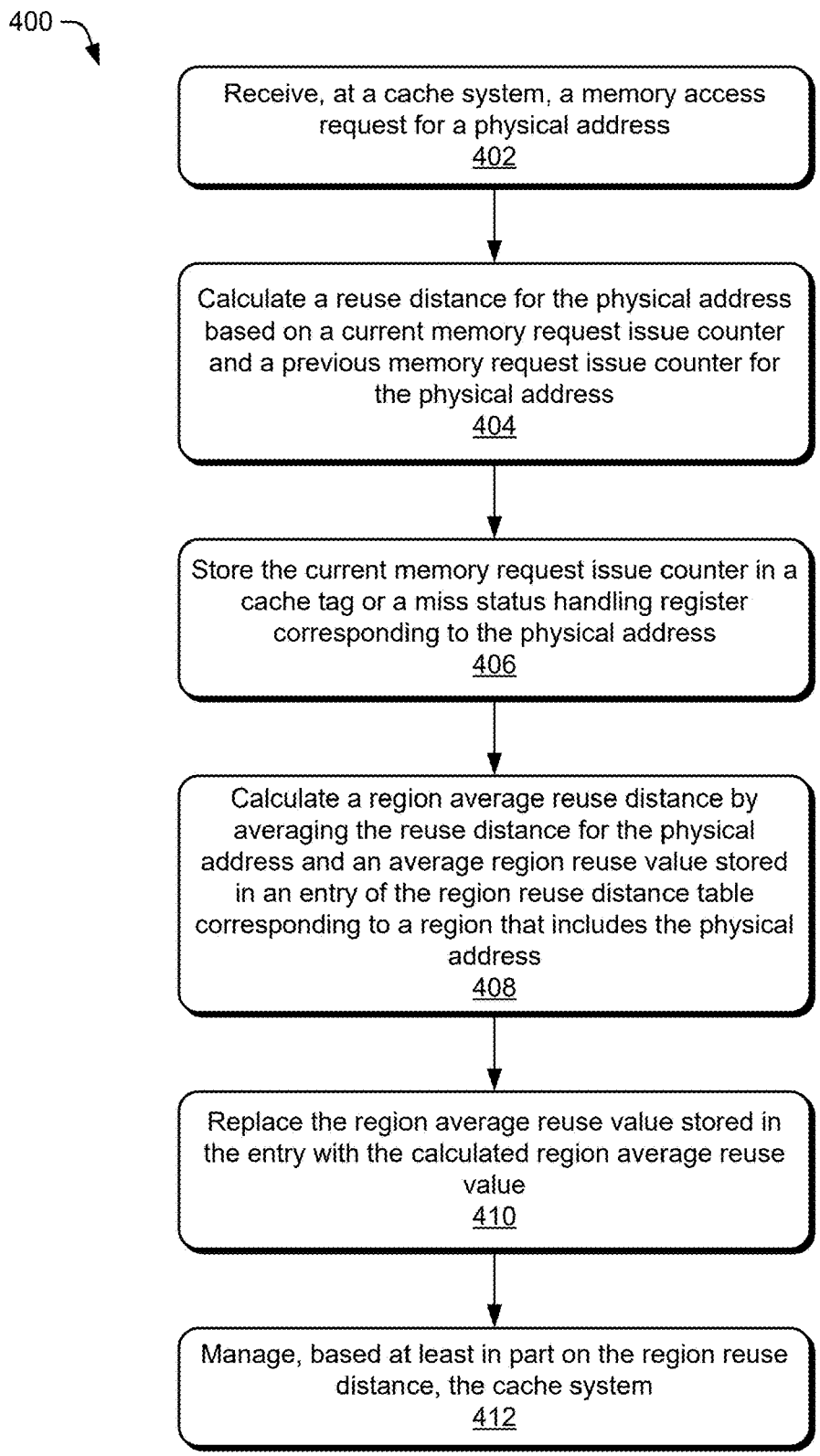
FIG. 4 is a flow diagram depicting a procedure in an example implementation of managing a cache using per memory region reuse distance estimation.

FIG. 4 is a flow diagram 400 depicting a procedure in an example implementation of managing a cache using per memory region reuse distance estimation. The flow diagram 400 is performed by a reuse distance estimation system, such as reuse distance estimation system 114 of FIG. 1 or reuse distance estimation system 200 of FIG. 2.

In this example, a memory access request for a physical address is received at a cache system (block 402). The cache system includes a cache memory and a cache controller.

A reuse distance for the physical address is calculated based on a current memory request issue counter and a previous memory request issue counter for the physical address (block 404). The previous memory request issue counter is, for example, the memory request issue counter value the last time the physical address was accessed.

The current memory request issue counter is stored in a cache tag or a miss status handling register corresponding to the physical address (block 406).

A region average reuse distance is calculated by averaging the reuse distance for the physical address and an average region reuse distance stored in an entry of the region reuse distance table corresponding to a region that includes the physical address (block 408).

The region average reuse distance stored in the entry is replaced with the calculated region average reuse distance (block 410).

The cache system is managed based at least in part on the region reuse distance (block 412). This management includes, for example, determining whether to bypass the cache, determining which cache lines to replace, and so forth.

The various functional units illustrated in the figures and/or described herein (including, where appropriate, the CPU cores 102, the cache system 104, the system memory 106) are implemented in any of a variety of different manners such as hardware circuitry, software executing or firmware executing on a programmable processor, or any combination of two or more of hardware, software, and firmware. The methods provided are implemented in any of a variety of devices, such as a general purpose computer, a processor, a processor core, or a cache system. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing device comprising:
   a cache memory; and
   a cache controller to:
   receive a memory access request for a physical address;
   calculate a reuse distance for the physical address based on a previous value of a memory request issue counter associated with the physical address that is stored in a cache tag;
   update, based at least in part on the reuse distance, a region reuse distance that corresponds to a memory region that includes the physical address; and
   manage, based at least in part on the region reuse distance, the cache memory.

2. The computing device of claim 1, wherein the cache controller is further configured to increment the memory request issue counter in response to each memory access request issued by a central processing unit core.

3. The computing device of claim 1, wherein to update the region reuse distance is to update the region reuse distance stored in an entry of region reuse distance table, wherein the entry corresponds to the memory region that includes the physical address.

4. A method comprising:
   receiving, at a cache system, a memory access request for a physical address;
   calculating a reuse distance for the physical address based on a previous value of a memory request issue counter associated with the physical address that is stored in a cache tag;
   updating, based at least in part on the reuse distance, a region reuse distance that corresponds to a memory region that includes the physical address; and
   managing, based at least in part on the region reuse distance, the cache system.

5. The method of claim 4, wherein the memory request issue counter is incremented in response to each memory access request issued by a central processing unit core.

6. The method of claim 4, wherein the reuse distance is calculated based on a current value of the memory request issue counter and the previous value of the memory request issue counter associated with the physical address, wherein the method further comprises replacing the previous value of the memory request issue counter in the cache tag with the current value of the memory request issue counter.

7. The method of claim 4, wherein the updating comprises updating the region reuse distance stored in an entry of a region reuse distance table, wherein the entry corresponds to the memory region that includes the physical address.

8. The method of claim 7, further comprising:
calculating an updated region reuse distance based on the reuse distance for the physical address and the region reuse distance stored in the entry of the region reuse distance table; and
wherein the updating the region reuse distance comprises replacing the region reuse distance stored in the entry with the updated region reuse distance.

9. The method of claim 8, wherein calculating the updated region reuse distance comprises calculating a region average reuse distance by averaging the reuse distance for the physical address and the region reuse distance stored in the entry of the region reuse distance table.

10. The method of claim 4, wherein the managing the cache system comprises selecting, based on the region reuse distance, one of multiple cache lines stored in the cache system to evict from the cache system.

11. The method of claim 4, wherein the managing the cache system comprises conditionally allocating, based on the region reuse distance, a cache line for the physical address in the cache system.

12. The method of claim 4, further comprising aging the region reuse distance over time.

13. A cache system comprising:
a cache controller to:
calculate a reuse distance for a physical address associated with a memory access request, the reuse distance calculated based on a previous value of a memory request issue counter associated with the physical address that is stored in a cache tag;
update, based at least in part on the reuse distance, a region reuse distance that corresponds to a memory region that includes the physical address; and
manage, based at least in part on the region reuse distance, the cache system.

14. The cache system of claim 13, wherein the memory request issue counter is incremented in response to each memory access request issued by a central processing unit core.

15. The cache system of claim 14, wherein the cache controller is further configured to replace the previous value of the memory request issue counter in the cache tag with a current value of the memory request issue counter.

16. The cache system of claim 13, wherein the cache controller is further configured to update the region reuse distance by updating the region reuse distance stored in an entry of a region reuse distance table, wherein the entry corresponds to the memory region that includes the physical address.

17. The computing device of claim 1, wherein the reuse distance comprises a difference between a current value of the memory request issue counter and the previous value of the memory request issue counter associated with the physical address.

18. The computing device of claim 1, wherein the cache controller is configured to manage the cache memory by selecting, based on the region reuse distance, one of multiple cache lines stored in the cache memory to evict from the cache memory.

19. The computing device of claim 1, wherein the cache controller is configured to manage the cache memory by conditionally allocating, based on the region reuse distance, a cache line for the physical address in the cache memory.

20. The computing device of claim 1, wherein the cache controller is further configured to age the region reuse distance over time.

* * * * *